(12) United States Patent
Isenmann et al.

(10) Patent No.: US 8,205,022 B2
(45) Date of Patent: Jun. 19, 2012

(54) GENERATING OF A DEVICE DESCRIPTION FOR A MEASURING DEVICE

(75) Inventors: Andreas Isenmann, Haslach i.K. (DE);
Harald Auber, Aichhalden (DE);
Fridolin Faist, Oberwolfach (DE);
Martin Gaiser, Alpirsbach (DE);
Manfred Kopp, Wolfach (DE); Robert Laun, Hausach (DE); Juergen Lienhard, Fischerbach (DE); Manfred Metzger, Haslach i.K. (DE); Ralf Schaetzle, Fischerbach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 12/605,577

(22) Filed: Oct. 26, 2009

(65) Prior Publication Data

US 2010/0121999 A1 May 13, 2010

Related U.S. Application Data

(60) Provisional application No. 61/113,856, filed on Nov. 12, 2008.

(30) Foreign Application Priority Data

Nov. 12, 2008 (EP) .................................... 08168977

(51) Int. Cl.
*G06F 13/00* (2006.01)
(52) U.S. Cl. ............................. 710/33; 710/60; 710/305
(58) Field of Classification Search ................ 710/8–12, 710/16, 19, 33–35, 60, 305
See application file for complete search history.

(56) References Cited

U.S. PATENT DOCUMENTS

| | | | | |
|---|---|---|---|---|
| 5,980,078 A | * | 11/1999 | Krivoshein et al. | 700/1 |
| 6,449,715 B1 | * | 9/2002 | Krivoshein | 713/1 |
| 6,715,001 B1 | * | 3/2004 | Birns et al. | 710/29 |
| 6,732,255 B1 | * | 5/2004 | Ling et al. | 712/42 |
| 7,346,404 B2 | * | 3/2008 | Eryurek et al. | 700/65 |

(Continued)

FOREIGN PATENT DOCUMENTS

WO 03/039098 5/2003

(Continued)

OTHER PUBLICATIONS

Hart Communications, Technical Information, Samson, 1999.*

(Continued)

*Primary Examiner* — Khanh Dang
(74) *Attorney, Agent, or Firm* — Fay Kaplun & Marcin, LLP

(57) ABSTRACT

A method for generating a device description for a measuring apparatus in a target field bus protocol is described. The method comprises the reception of a first device description of the apparatus. The first device description of the apparatus comprises at least one variable. The at least one variable is related to a storage cell of the apparatus. The target field bus protocol is selected from a plurality of field bus protocols, and at least one block is formed from the at least one variable. The at least one block has a maximum block size that corresponds to the smallest maximum block size of at least two field bus protocols of the plurality of field bus protocols. The maximum block size can be transmitted via a field bus with a single request when the respective field bus protocol is used. Subsequently, the at least one block is provided as device description for the apparatus in the target field bus protocol.

15 Claims, 7 Drawing Sheets

U.S. PATENT DOCUMENTS

| | | | |
|---|---|---|---|
| 7,730,450 B2 * | 6/2010 | Mercer | 717/120 |
| 2002/0194365 A1 | 12/2002 | Jammes | |
| 2003/0004675 A1 * | 1/2003 | Thurman et al. | 702/123 |
| 2003/0056043 A1 | 3/2003 | Kostadinov | |
| 2007/0075916 A1 * | 4/2007 | Bump et al. | 345/3.1 |
| 2007/0077665 A1 * | 4/2007 | Bump et al. | 438/14 |
| 2007/0078956 A1 * | 4/2007 | VanGompel | 709/220 |
| 2007/0088518 A1 * | 4/2007 | Braun | 702/108 |
| 2008/0101251 A1 | 5/2008 | Casebolt | |
| 2010/0091799 A1 * | 4/2010 | Hancsarik et al. | 370/474 |
| 2010/0094981 A1 * | 4/2010 | Cordray et al. | 709/222 |

FOREIGN PATENT DOCUMENTS

WO    2007/071212    6/2007

OTHER PUBLICATIONS

Profibus View, Profibus PA Device Parameterization Software, SMAR, Jan. 2008.*

Kaiser et al., "Self-Describing Devices in COSMIC", 10$^{th}$ IEEE International Conference on Emerging Technologies and Factory Automation, No. 1, Sep. 19, 2005, pp. 669-672, XP010905392.

Dobrescu et al., "Smart Sensor with Dual Standard Fieldbus Interconnection Capability", Proceedings of the 2001 IEEE International Conference on Control Applns., Sep. 5, 2001, pp. 1179-1183, XP010571137.

Granzer et al., "Gateway-Free Integration of BACnet and KNX Using Multi-Protocol Devices", Industrial Informatics 2008, 6$^{th}$ IEEE International Conference, Jul. 13, 2008, pp. 973-978, XP031316171.

Buhler, "The CANopen Markup Language Representing Fieldbus Data with XML", IECON 2000, 26$^{th}$ Annual Conference of the IEEE, No. 4, Oct. 22, 2000, pp. 2449-2454, XP010569177.

Simon et al., "Field Devices—Models and their Realisations", Industrial Technology, 2002 IEEE International Conference ICIT, No. 1, Dec. 11, 2002, pp. 307-312, XP010637322.

Simon et al., "Integration of Field Devices Using Field Device Tool (FDT) on the basis of Electronic Device Descriptions (EDD)", Industrial Electronics, 2003 IEEE International Sympos. IUM, No. 1, Jun. 9, 2003, pp. 189-194, XP010682646.

* cited by examiner

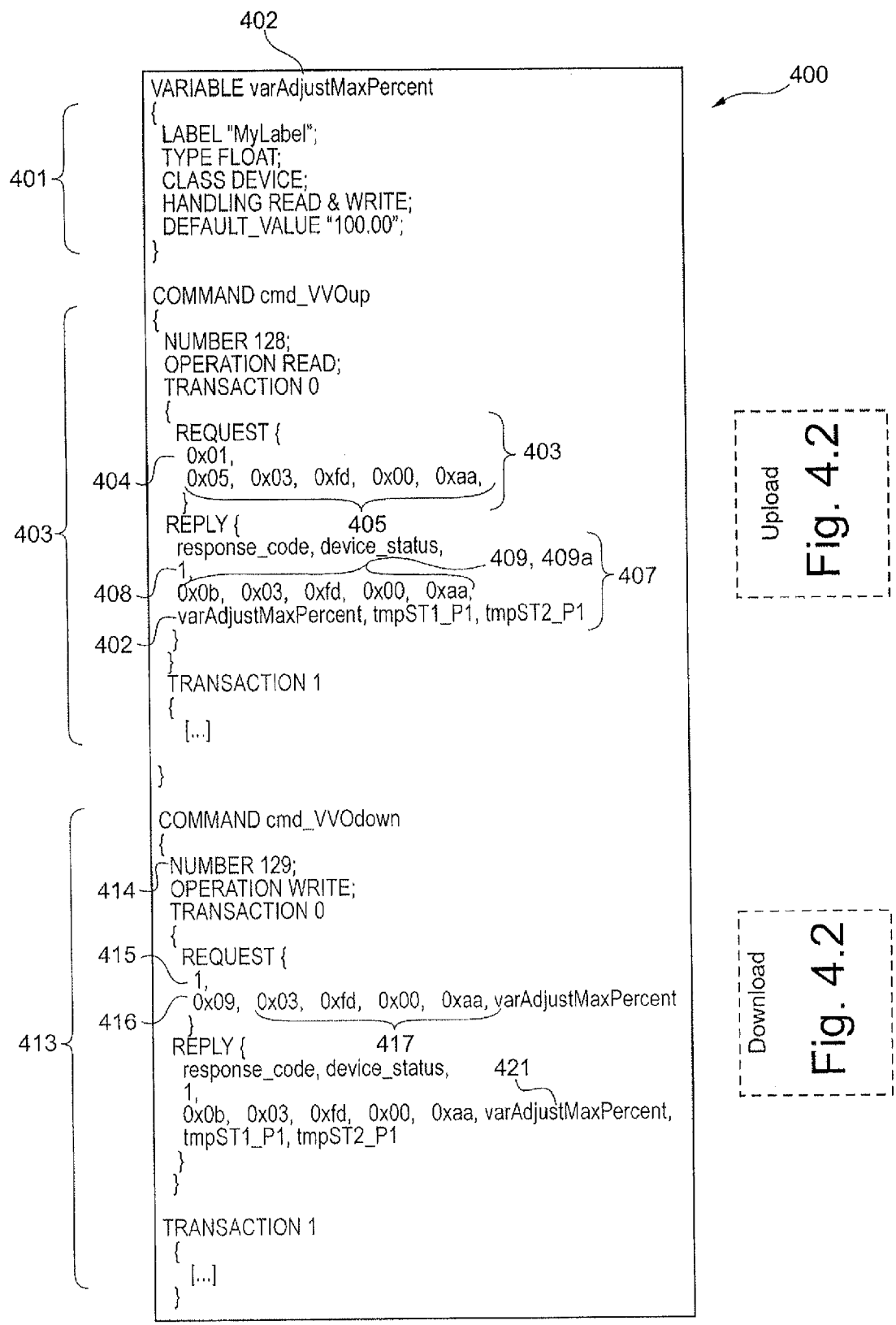
Fig. 4.1

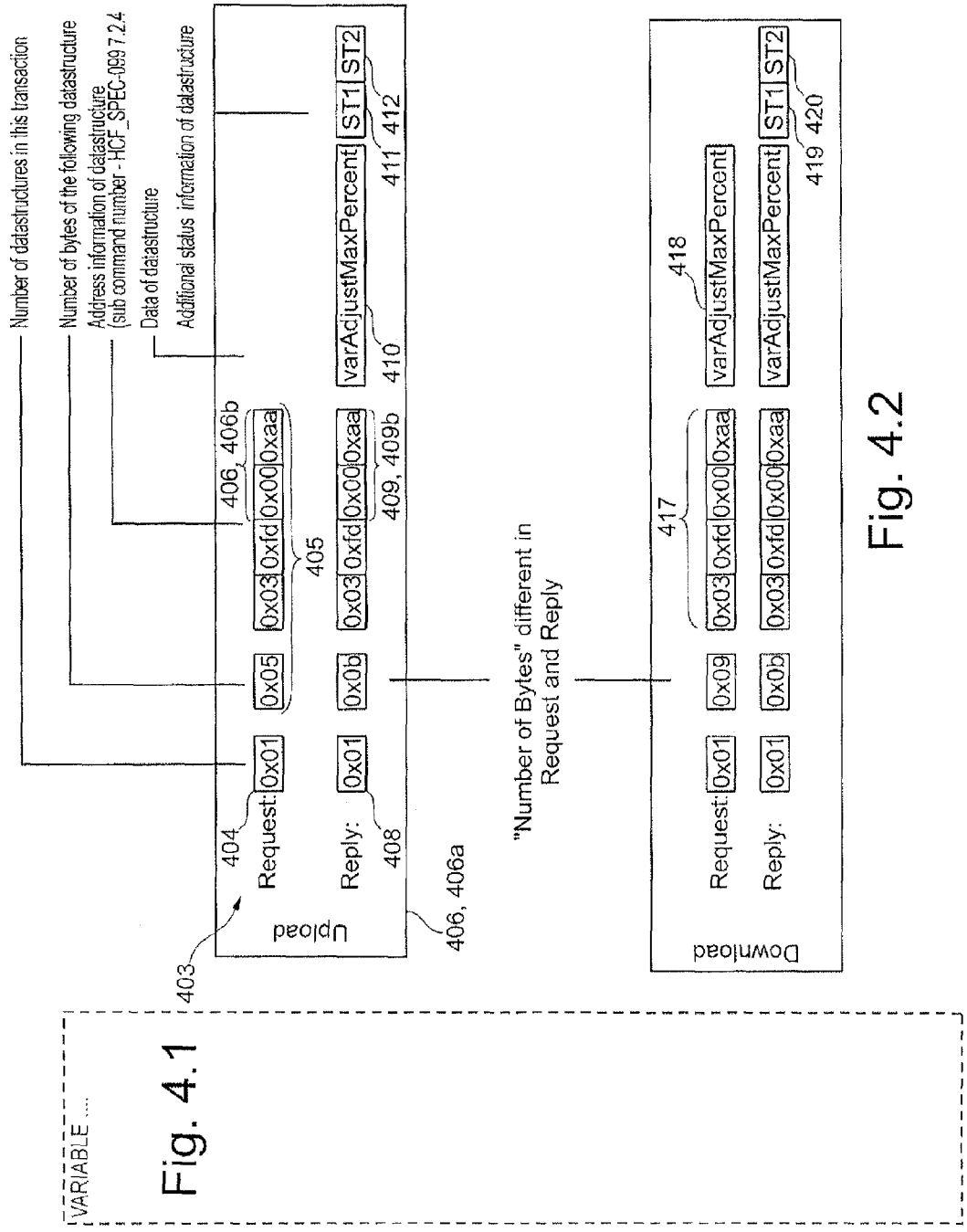

GENERATING OF A DEVICE DESCRIPTION FOR A MEASURING DEVICE

REFERENCE TO RELATED APPLICATIONS

This application claims the benefit of the filing date of EP Patent Application Serial No. EP08168977 filed Nov. 12, 2008, the disclosure of which is hereby incorporated herein by reference and U.S. Provisional Patent Application Ser. No. 61/113,856, filed Nov. 12, 2008 the disclosure of which is hereby incorporated by reference.

FIELD OF THE INVENTION

The present invention relates to the technical field of measuring technology. The present invention particularly relates to a method for generating a device description for a measuring apparatus, a computer-readable storage medium, an apparatus for generating a device description for a measuring apparatus, an arrangement of at least one storage cell and a measuring sensor.

TECHNOLOGICAL BACKGROUND

Measuring devices, particularly field devices, for example, a sensor or an actuator may comprise an operation device or a user interface for operating the sensor. The user interface or the operating tool may be arranged distant from the sensor. In one example, the sensor may be connected to the user interface via a field bus or a field device bus.

This may mean that a user interface that may make it possible to communicate with the measuring device may be provided in an operation device, particularly an evaluation device. The user interface may be a command line on the evaluation device, but the user interface may also be a graphical user interface (GUI). In other words, the user interface may be implemented as a command line on the evaluation device or as a graphical user interface.

Examples of graphical user interfaces may be the operating tools AMS by Emerson, PDM by Siemens or PACTware™ by PACTware Consortium e.V.

In order to integrate a measuring device, a measuring apparatus or a field device of different manufacturers into the operating tools, the respective manufacturer of the field device may provide a user interface that is adapted to the corresponding field device in the form of a specific device description for the measuring apparatus and/or the field device bus.

The device description may be provided, for example, in a description language. The device description in a description language may depend on the respective field device, but may also depend on the respective field device bus, on which the respective field device should be used. A field device bus may be based on a field device bus protocol.

SUMMARY OF THE INVENTION

There may be a need to allow an efficient providing of a device description.

According to one exemplary embodiment of the present invention, a method for generating a device description for a measuring apparatus, a computer-readable storage medium, an apparatus for generating a device description for a measuring apparatus, an arrangement of at least one storage cell and a measuring sensor may be provided.

According to one exemplary embodiment of the present invention, a method for generating a device description for a measuring apparatus in a target field bus protocol may be provided. The method may comprise receiving of a first device description of a measuring apparatus. The first device description of the measuring apparatus may comprise at least one variable. The at least one variable may be related to a storage cell of the measuring apparatus.

The method may furthermore comprise selecting of a target field bus protocol from a plurality of field bus protocols. In one example, the method may comprise forming of a block from the at least one variable, wherein the at least one block may have a maximum block size. The at least one block may, for example, have a maximum block size that may correspond to the smallest maximum block size of the plurality of field bus protocols. In another example the block size may be smaller than the smallest maximum block size. In yet another example the maximum block size may correspond to the smallest maximum block size of at least two field protocols of at least two target field buses. This maximum block size may be transmitted with a single request in substantially all of the plurality of field buses. The maximum block size may be transmitted in at least the two selected target field buses.

This maximum block size, i.e., a block having a size, which at maximum corresponds to the maximum block size, may furthermore be able to be transmitted via a field bus with a single request, with a single instruction or with a single command when the respective field bus protocol is used. In other words, this maximum block size, i.e., a block with a size that is no larger than the maximum block size, may furthermore be able to be transmitted via a field bus with a single request, with a single instruction or with a single command when the respective field bus protocol is used. This may mean that the at least one block can be completely read and/or written in each of the plurality of field bus protocols with a single command.

In one example the method for generating a device description, may comprise the providing of the at least one block as a second device description for the measuring apparatus, wherein the second device description may be represented in the target field bus protocol, in a target format or in a target device language. The second device description may be a second device description file. This second device description may be, for example, an addressing schema for the measuring apparatus. The target device description may comply to the target field bus protocol.

In one example, the providing in a target field bus protocol may comprise the providing of a device description, wherein the device description may be adapted in such a way that the device description can be used in a field bus that may operate in accordance with the target field bus protocol.

According to another exemplary embodiment of the present invention, a computer-readable storage medium may be provided that may comprise a program code that may carry out the inventive method when it is executed by a processor.

A computer-readable storage medium may, for example, be a hard disk, a Floppy-Disk, a CD (Compact Disc), a DVD (Digital Versatile Disc), a Read Access Memory (RAM), a Programmable Read Only Memory (PROM), an Erasable PROM (EPROM), a Mass Storage Device on a Universal Serial Bus (USB), a storage chip or a similar data carrier. The term computer-readable storage medium may also refer to a computer network such as, for example, the Internet that can serve for distributing computer programs.

According to another exemplary embodiment of the present invention, a program element may be created, which program element may carry out the inventive method when it is executed by a processor.

According to yet another exemplary embodiment of the present invention, an apparatus for generating a device description for a measuring device or for a measuring apparatus may be provided, wherein the apparatus may comprise a receiving device, a selecting device and a providing device.

The receiving device may be adapted for the reception of a first device description for the measuring apparatus, i.e., the first device description may describe the measuring apparatus. The measuring apparatus itself or the first device description of the measuring apparatus may comprise at least one variable, wherein the at least one variable may be related to a storage cell of the measuring apparatus or may be associated with a storage cell of the measuring apparatus. In other words, particularly a storage device or storage arrangement of the measuring apparatus may comprise at least one storage cell. A variable may be assigned to this storage cell in the first device description such that the storage cell may be related to the variable.

The selecting device may be adapted for selecting a target field bus protocol from a plurality of field bus protocols.

The providing device may be adapted for forming of at least one block from the at least one variable. The at least one block may have a maximum block size, which maximum block size may correspond to the smallest maximum block size of the plurality of field bus protocols, wherein a block of the maximum block size may be transmittable via a field bus with a single request when the respective field bus protocol is used. Thus, it may be possible to transmit a block of the maximum block size via a field bus with a single request when the respective field bus protocol is used. The providing device may furthermore be adapted for providing the at least one block as a second device description for the measuring device in a target field bus protocol. In other words, the providing device may be adapted for providing a file as second device description which file may make it possible to operate the measuring apparatus on a field bus, which field bus may be based on the target field bus protocol.

According to yet another exemplary embodiment of the present invention, an arrangement of at least one storage cell may be provided, wherein the at least one storage cell may be related to at least one variable. At least one block may be formed from the at least one variable, wherein the at least one block has a maximum block size, which maximum block size may correspond to the smallest maximum block size of a plurality of field bus protocols, which maximum block size can be transmitted via a field bus with a single request when the respective field bus protocol is used. The entire block size, i.e., the maximum block size, may not always be utilized in its entirety. Block sizes that are smaller than the maximum block size would also be possible.

In one example, the at least one storage cell may be combined into a block in such a way that it may be possible to transmit the content of the least one storage cell between the measuring apparatus and an operating tool with a single request or with a single instruction.

According to yet another exemplary embodiment of the present invention, a measuring sensor may be provided that may comprise an inventive arrangement.

A measuring apparatus, particularly a measuring device, a field device, a sensor or an actuator, may have a plurality of variables, which variables can assume values. The values of the variables may define a configuration for the respective field device. A field device may comprise, in particular, a storage component or a storage device, which comprises a plurality of storage cells that can be provided with names due to the assignment of variables. I.e. variables can be allocated to the storage cells and thus, names for the storage cells may be provided.

It may be possible to arrange the storage cells, particularly the variables assigned to the storage cells, in the form of data structures. In this case, it may be possible to combine different storage cells into blocks that can be addressed based on a data structure name or an Object-ID (Object Identifier). The Object-ID may be a base address that marks the beginning of a data structure in the storage, in the memory, in the storage component or in the storage chip. A data structure may comprise the combination or cumulation of similar storage cells or storage cells that belong together. In other words, a data structure may comprise an orderly combination of storage cells. It may be possible to store parameterizing values respectively values for setting parameters in the storage cells, which parameterizing values may designate respectively identify sensor-specific properties.

For example, the manufacturer of the field device may be identified by means of a manufacturer-ID or manufacturerID. Furthermore, the sensor or the field device, particularly the type of sensor, may be able to be characterized by means of a devicetype or a deviceType. It may be possible to combine similar storage cells by means of the Object-ID or by means of the data structure name. Thus, it may be possible to find sensor-specific variables or storage cells that may allow recognizing or identifying the sensor under the data structure name "identification."

The data structure "identification" may comprise a manufacturer-ID (Manufacturer-ID), a device type (Device Type), a bus type (Bus Type), a serial number (Serial Number) and a DTM-ID (Device Type Manager Identifier/identification of the DTM to be used for the configuration).

The number of variables that are combined under one data structure name or the number of data structures that are combined under the data structure name may correspond to a block size. The block size may be characterized or defined as the block size that can be transmitted simultaneously by a plurality of available field device bus protocols with a single request or a command. The available field device bus protocols may be those field device bus protocols, from which at least one protocol may be selected. Simultaneously in this context may mean that the block size may be used for a plurality of available field device protocols without changing the block size.

The choice of the block size, i.e., the choice of the maximum number of storage cells combined into a data structure, may allow achieving to be able to use the same data structure and/or the same Object-ID for the same data structure in each of the available field device buses.

It may be possible to simultaneously transmit the same data structures in all field device bus standards or in all field device bus systems. All field device bus standards may mean all available or most of the field device bus standards.

A measuring apparatus may be represented or described in different description languages in different field device bus systems or field bus systems. It may be possible to prevent that irregular or heterogeneous data structures need to be used for the respectively available plurality of field device bus protocols in the different descriptions by adapting the block size for the data structures. Consequently, in different field device buses a regular, a homogenous, a standardized or a uniform description may be present for the same sensor by adjusting or adapting the block size.

A uniform first device description or a manufacturer-specific device description (Device Description, DD) may be taken as the basis, as a source or as an origin. This first device description, manufacturer-specific description or source device description may be present respectively available in a sensor-specific description language such as, for example, XML (Extensible Markup Language). In other words, the source device description in XML may be described with a sensor-specific structure or with a manufacturer-specific structure.

The parameterizing values or the values for setting parameter of the measuring apparatus, particularly also the measured values, may be organized in the form of storage cells in the measuring apparatus, in the field device or in the sensor. Variables may provide the storage cells with names, wherein each variable may be associated with at least one storage cell. The variables or storage cells may be combined into a data structure under an Object-ID. This may mean that the contents of the storage cells of the data structure may be delivered when querying the respective Object-ID or the data structure.

Combining of the variables into at least one block or forming of at least one block may make it possible to provide the same variables, the same contents of the storage cells or the same values of the parameterizing values (values for setting parameters) stored in the storage cells in each of the available field bus protocols using a request or using a single request. Consequently, a uniform addressing of the variables, parameters or parameterizing values respectively values for setting parameters may be possible in the different target field bus protocols, i.e., in the field bus protocols, for which an addressing schema or a device description should be generated.

For example, the same Object-ID may address or query the same data structure in the different target field bus protocols.

It may therefore be an aspect of the present invention to partition a measuring apparatus, a sensor or a field device, particularly a storage of a measuring apparatus, into blocks and to describe the measuring apparatus, the sensor or the field device by means of a first device description or source device description such that for substantially all (saemtliche) target field bus protocols, which may be considered as target field bus systems, a uniform base structure may be provided. A target field bus protocol may be a field bus protocol, for which a field bus protocol-specific device description of the measuring apparatus, particularly of the sensor, or a second device description should be generated. It may therefore be possible to translate the first device description into a second device description in dependence on the selected target field bus protocol.

The addressing of the storage cells by means of an Object-ID and an associated data structure may allow the adaptation to different field bus protocols.

In one example, the first device description, the original device description, the origin device description or the source device description may be present as a file in the XML format.

According to another exemplary embodiment of the present invention, the target field bus protocol may be at least one target field bus protocol that is selected from the group of target field bus protocols consisting of the HART field bus protocol, the Profibus bus protocol, the Profinet, the Foundation Fieldbus Protocol, the I/O-Link-Protocol, the Modbus-Protocol and the CAN-Protocol (Controller Area Network). The target field bus protocol may be that field bus protocol, on which the selected target field bus may be based. The target field bus may be the field bus, in which the sensor may be intended to be used.

It may be possible to describe the measuring apparatus in a selected subgroup of the field bus protocols, particularly in the target field bus protocols, in a uniform fashion.

According to another exemplary embodiment of the present invention, the second device description, the target device description, the target format or the addressing schema may be provided in a device description language that may be selected from the group of device description languages consisting of DDL (Device Description Language), EDDL (Enhanced DDL) or for a DTM (Device Type Manager) based on the FDT (Field Device Type).

In another example, a description language, which may be a combination of FDT and EDD, may be used, for example FDI (Field Device Integration). The corresponding description can also be generated for FDI.

According to another exemplary embodiment of the present invention, it may be possible to address the at least one block by means of an Object-ID.

Consequently, it may be possible to read out an entire data structure and, in particular, the values of the data structure by using a single Object-ID or a single base address.

According to yet another exemplary embodiment of the present invention, it may be possible to substantially unambiguously address the entire first device description of the measuring apparatus by mapping or projecting in the operating tool the second device description or the addressing schema on a device-specific region in the respective field device field bus protocol or in a device description that belongs to the field device protocol.

This can make it possible to map a uniform device description language, for example in the XML format, on a target field bus protocol.

It may be possible to represent the general device description or the manufacturer-specific device description of a field device or to represent the field device in the respective target operating tool by the mapping.

The device-specific region of a field bus protocol may be a region that may be reserved, for example, for manufacturer-specific data and information, respectively such as, for example, Device Specific Commands or a transducer block.

According to yet another exemplary embodiment of the present invention, the second device description or the addressing schema may be provided in such a way that different blocks or different Object-IDs can be addressed by means of a single command number and/or by means of a single transaction number.

A DDL description language for a HART field device bus or for the HART field bus protocol may comprise the mapping of variable names on requests or on inquiries, wherein the requests comprise a command number and/or a transaction number. An inquiry command may be able to be compiled in an operating device, which operating device may allow the access to the specific address in the field device, by using the variable name that may correspond to the variable name of the storage cell in the measuring apparatus.

A provision of values may also be realized in an analogue manner. Consequently, the term request may also refer to a provision of parameterizing values and of values for setting parameters, respectively. The block size therefore may be the smallest information unit that can be exchanged between an operating device or an operating tool and a field device.

Utilizing a command number and/or a transaction number therefore may allow establishing a relation between the operating tool and the field device. The number of usable transactions may be limited. It may be possible to query different Object-IDs by increasing the command number such that a paging of the measuring apparatus or of the storage of the measuring apparatus can be achieved.

According to yet another exemplary embodiment of the present invention, the second device description may be provided in such a way that different blocks or different Object-IDs can be addressed by means of a slot number and/or by means of an index. In other words, in a Profibus environment the blocks may be addressed by the slot number and/or index number, whereas in a HART bus environment these blocks are addressed by a command number and/or a transaction number.

A slot number and/or index number may be utilized in a Profibus field bus system. In a Profibus environment, it may be possible to address by means of the slot number and the index the same blocks of the measuring apparatus as those blocks addressed by means of a command number and/or transaction number in a HART bus environment.

The selection of the block sizes such that the block size corresponds to the smallest maximum block size for an inquiry and/or for a provision of variables may allow uniformly querying of the blocks in the different field bus systems.

According to another exemplary embodiment of the present invention, the measuring apparatus may be a measuring apparatus that is selected from the group of measuring apparatuses consisting of a sensor, an actuator, a level measuring sensor, a pressure measuring sensor, a limit level measuring sensor and a field device.

According to yet another exemplary embodiment of the present invention, the at least one variable may correspond to a parameterizing value or to a parameter setting value. Consequently, it may be possible to parameterize the measuring apparatus and to set parameters in the measuring apparatus, respectively for the measuring operation by means of the at least one variable, the data structure or a plurality of variables.

According to yet another exemplary embodiment of the present invention, the provision of the at least one block as second device description may comprise the combining of blocks into a single request and/or a single command. The at least one block may be provided in the form of a second device description.

Consequently, small data structures may be queried or provided in a single command, i.e., in an inquiry or in a provision.

According to another exemplary embodiment of the present invention the method may further comprise combining at least two blocks into one single common block or into a joint block, the block size of which may be smaller or equal to the maximum block size.

According to yet another exemplary embodiment of the present invention, the first device description may be an XML file. In other words, the device description may be implemented as an XML file.

It should be noted that different aspects of the invention were described with reference to different subject matters. Some aspects were described, in particular, with reference to apparatus-type claims while other aspects were described with reference to method-type claims. However, a person skilled in the art can gather from the preceding description and the following description that, unless explicitly mentioned otherwise, any combination of features that belong to one category of subject-matters also comprise any combination of features that refer to different categories of subject-matters. In particular, combinations between features of apparatus-type claims and features of method-type claims shall be regarded as disclosed.

BRIEF DESCRIPTION OF THE DRAWINGS

Other exemplary embodiments of the present invention are described below with reference to the figures.

FIGS. 4.1 and 4.2 show a detailed illustration of a device description in a device description language with associated upload and download instructions according to one exemplary embodiment of the present invention.

DETAILED DESCRIPTION OF EXEMPLARY EMBODIMENTS

Figure 1:
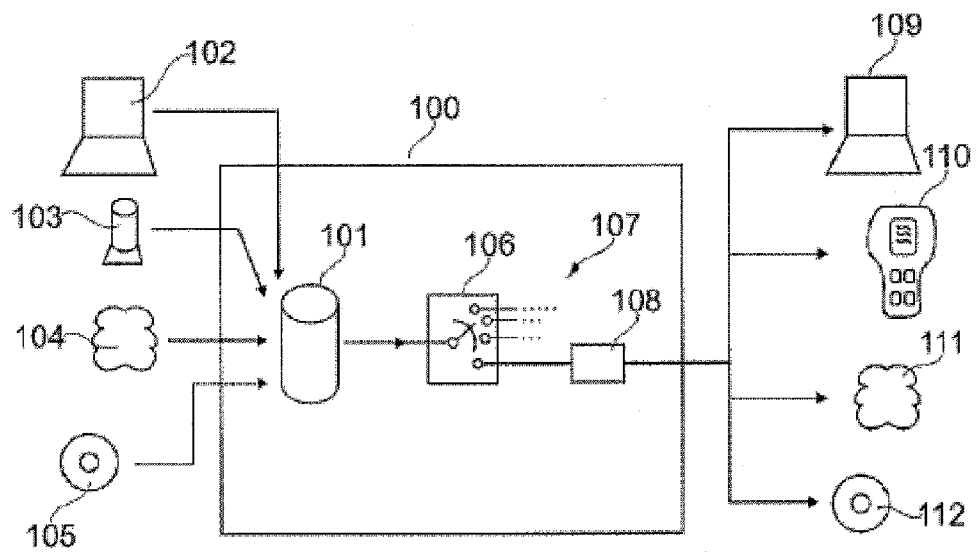
FIG. 1 shows a block, diagram of an apparatus for generating a device description according to one exemplary embodiment of the present invention.

The presentations in the figures are schematic and are not true-to-scale. In the following description of FIG. 1 to FIG. 7, same or corresponding elements are identified by the same reference numerals.

FIG. 1 shows an apparatus for generating 100 a device description for a measuring device. The apparatus for generating 100 a device description or the code generator 100 comprises a receiving device 101. The receiving device 101 can obtain the first device description or the manufacturer-specific device description from different input sources. For example, the receiving device 101 is connected to the input device 102, via which the first device description can be provided. For example, the input device 102 comprises a keyboard. The receiving device 101 may also be directly connected to the measuring device 103, a measuring apparatus 103 or the sensor 103. The receiving device 101 consequently can read out the description directly from the field device to be written to and to be described, respectively or the measuring device 103 to be written to and to be described, respectively.

In other words, the receiving device 101 can read the description directly from the field device to be described or the measuring device 103 to be described.

The device description can also be provided via the network 104 that is connected to the receiving device 101. In addition, any data carrier 105 or a computer-readable storage medium 105 such as, for example, a CD, a DVD, a Floppy Disk, a Hard Disk, a USB-Mass Storage Device (mass storage device), a Flash Memory or an EPROM 105 may be connected to the receiving device 101 in order to provide the first device description of a measuring apparatus 103.

The first device description essentially comprises an addressing schema, an arrangement of a storage or a representation of the partition of a storage area in the measuring apparatus 103 or for the measuring device. In this case, the storage partition of the measuring apparatus is chosen such that variables or parameters that belong together are combined into data structures.

The data structures are given names that can be queried by Object-IDs. In this case, the partition of the storage, of the storage area, of the storage region and of the storage device, respectively is essentially based on a block size that can be provided by a plurality of field bus protocols or target description languages at maximum, i.e., the maximum block size that can be transmitted by all target field bus protocols by means of one call, i.e., by means of a single command, is determined after it has been determined for which field bus protocols a device description for a measuring device should be provided. In this case, the transmission of blocks and the inquiry, respectively may refer to an upload, as well as to a download, i.e., the maximum block size is determined together for inquiry commands and for descriptive commands and writing commands, respectively (Read Command/Write Command).

The receiving device 101 is adapted to partition or to allocate the received device description or the read out device description if it does not yet correspond to the maximum common block size, in such a way that blocks are formed from the received first device description, from the manufacturer-specific device description, from the uniform device description or from the unified device description (Einheitsgeraetebeschreibung) and such that for all target field bus protocols, all target device descriptions or all second device descriptions to be generated it is ensured to operate with the same block size. In other words, the device description is partitioned or segmented such that blocks are formed by the device description such that all the desired target field bus protocols can operate with the same common block size. This may make it possible to address the same or similar variables or the same or similar parameters in the measuring apparatus by means of the same Object-ID. Consequently, the clarity of the inquiry instructions may be improved because it is not necessary to generate a different partition or segmentation of the variables or storage cells for the field device in each field bus system.

The target field bus protocol and the format of the target device description, respectively or the target addressing schema can be set up by means of the selecting device 106 that is connected to the receiving device 101. Consequently, a device description that is adapted to a target field bus protocol can be generated by means of the selecting device based on the uniform first device description or manufacturer-specific device description that may be, for example, an XML file. The thusly adapted target device description, the target addressing schema or the second device description is respectively delivered to a providing device 108 assigned to the selection channels 107. (Only one providing device of the plurality of providing devices is illustrated in FIG. 1. The structure or the connection of the other providing devices is realized similar to the providing device 108 shown. The other providing devices are also connected to the peripheral devices 109, 110, 111, 112.)

The provision in the providing device 108 and in the initializing device 108, respectively may be realized, for example, in the form of a file. In this case, the file can be provided in the form of a DDL- or EDDL-description or in a format to be used by a DTM. Furthermore, a field device bus-specific XML-file can be once again provided. For example, a providing device 108 for the HART field bus protocol, for the Profibus field bus protocol or for the Foundation Fieldbus Protocol may exist.

The device description generated in the respective providing device 108 can be once again provided in different forms. For example, the device description can be provided by a control computer 109 with keyboard and monitor. Furthermore, the generated device description can be loaded directly on an operating tool 110. A command line-based user interface or a graphical user interface, i.e., a user interface that operates with symbols, may run on the operating tool.

In addition, the generated device description can be provided via the network 111 that may be the same network as the input network 104. Consequently, a generated device description can be made available to a plurality of customers via the network 111. The generated device description can also be loaded on the storage medium 112 by the providing device 108 and distributed or sold. The storage medium 112 may be a Floppy Disk, a CD, a DVD, a USB-Mass Storage Device or a Flash Memory. In addition to the described input and output options, there also exist further output options or storage mediums that are adapted for storing files.

In order to integrate field devices or measuring apparatuses of different manufacturers into an operating tool, the respective manufacturer of the field device provides in the form of a file a user interface that is adapted to the corresponding field device. Different technologies or technology concepts that need to be taken into account in the preparation of user interfaces for the respective operating tool by means of the description languages have established themselves as architecture for the operating tools. The availability of a user interface for an operating tool, that is present at a user, may matter with respect to the decision to purchase a field device.

For example, one technology is the Field Device Tool (FDT) System with Device Type Managers (DTM). In the FDT technology, binary files are used as a user interface description file in order to describe the user interface of the associated field device. The user interface description file (DTM) is equipped with the so-called FDT-interface and is read into the operating tool used (also referred to as frame application or frame) so as to address the field device via the operating tool. In this case, the FDT-interface defines the connection channel between frame application (e.g., PACTware™) and DTM.

The Device Description (DD) concept, the Electronic Device Description (EDD) concept and the Enhanced EDD (EEDD) concept, respectively pursue another concept. In DD, EDD or EEDD, the user interface or the device description is provided in an ASCII text that is written by utilizing a description language, parts of which are comparable to the programming language C. Therefore, the user interface description file is a text file.

After being read into the associated operating tool, the device description of the field device that is either provided in the form of a binary file or in the form of an ASCII file serves for the representation of the field device in a user interface within the operating tool or within the operating tool environment. The field device can be addressed via the uniform operating tool by the interface generated for the field device in the operating tool.

The providing of a device description for an operating tool 110 may make it possible to establish a relation between the operating tool 110 and the associated measuring device, for example the sensor 103.

Figure 2:
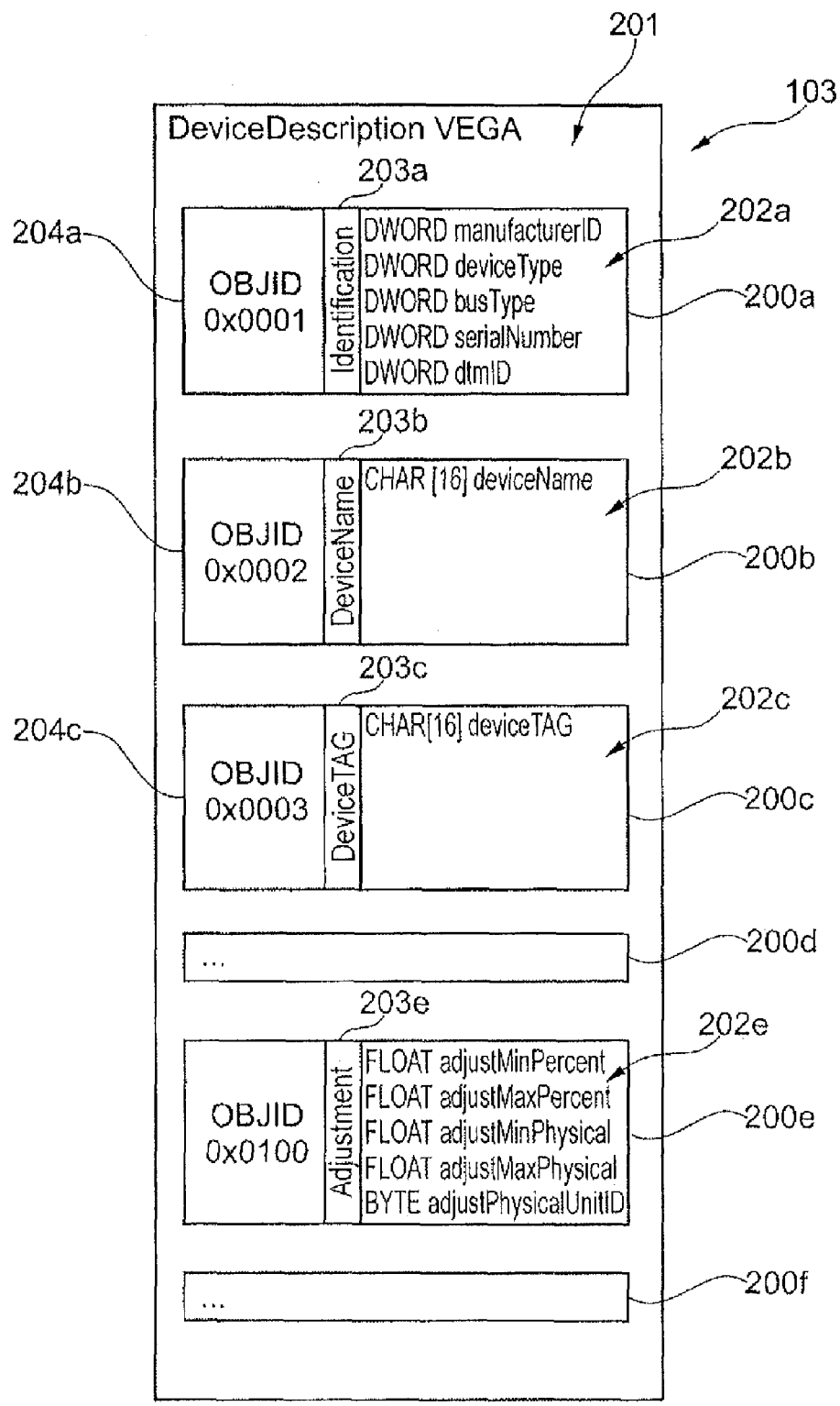
FIG. 2 shows a block diagram of a measuring apparatus with an addressing schema according to one exemplary embodiment of the present invention.

FIG. 2 shows a block diagram of a measuring apparatus with an addressing schema according to one exemplary embodiment of the present invention.

The measuring device 103 shows a partition or segmentation of a storage area into a plurality of blocks 200a, 200b, 200c, 200d, 200e, 200f of substantially equal size. In this case the size of the blocks 200a to 200f is based on the smallest common block size that can be transmitted in a plurality of field bus systems with one instruction. For example, the size of a block that can be transmitted with one inquiry or with one command in a HART bus system may amount to 20 byte while the maximum block size in a Profibus field bus system amounts to 64 byte.

In order to ensure the same Object-IDs or the same partition of the storage cells 201 in the HART system and as well in the Profibus system, one resorts to the smallest maximum block size, for example, when there is a selection between the HART system and the Profibus system. In the case of the HART system with 20 byte and the Profibus system with a maximum block size of 64 byte, a maximum block size of 20 byte is therefore selected.

In addition, logically associated storage cells are combined in one block 200a to 200f. Thus, for example, the storage cells 202a that concern the identification of a sensor with respect to the cells' function or to the function of the values stored in the cells are provided with variable names and combined into one data structure 202a. Thus, cells comprising values that help identifying the sensor are given names and the cells are combined into one data structure.

The data structure 202a is provided with a data structure name 203a. It may be possible to address the data structure 202a under the Object-ID 204a, for example OBJID 0x0001. The Object-ID is an address in hexadecimal notation. For example, the first block of measuring apparatus 103 combines the storage cells Manufacturer-ID, the Device Type, Bus Type, Serial Number and DTM-ID, all of which have the size DWORD, i.e., 4 byte, into the name of the data structure "Identification" 203a, i.e., the storage cells form a corresponding block. The first block 200a can be addressed under the Object-ID Obj ID 0x0001 204a.

One BYTE may comprise 8 Bit, a WORD may comprise 16 Bit and a DWORD may comprise 32 Bit.

In other words, if the firmware of the measuring apparatus 103 receives an inquiry command with the corresponding Object-ID 204a, 204b, 204c, the firmware provides the storage cells 202a of the data structure 203a, 203b, 203c. The firmware provides, in particular, an occupancy or content of the storage cells. For example, the Manufacturer-ID is a unique identifier for the manufacturer such that it can be determined, for example, that the manufacturer of the present sensor is the firm VEGA based on the Manufacturer-ID.

The data structure 202a also comprises the variable Device Type that contains a number that provides information on the measuring device 103 used. For example, the number 232 designates a measuring device VEGAPULS while the number 231 designates a VEGAFLEX.

In addition, the data structure 'Identification' comprises the storage cell Bus Type that indicates the bus, for which the device should be used. The indication Bus Type in the general device description may be used for reading out variables via proprietary interfaces. The data structures of the general device description therefore can also be used for communicating via the proprietary I2C-interface or I²C-interface. Proprietary may mean that it essentially does not concern a field bus protocol and the measuring sensor can be directly accessed. In order to allow determining the bus, for which the sensor may be designed, via this interface, this indication about the bus can be provided in the structure. In addition, the block Identification 200a comprises the serial number of the measuring device 103. The respective measuring device can be substantially unambiguously identified with this serial number.

The data structure 202a of the first block 200a furthermore comprises the variable DTM-ID (Device Type Manager ID) of the Device Type Manager used. This variable may also make it possible to realize a fairly special DTM-operation, i.e., one that deviates from the standard, for the individual sensor.

The second block that is illustrated in FIG. 2 is the block with the data structure name 203b "Device Name." This second block can be addressed under the Object-ID 0x0002 204b. The data structure 203b comprises the character value Char[16] Device Name 202b as data structure.

In comparison with the block "Identification" 200a, the block "Device Name" 200b comprises a smaller number of storage cells or variables in the data structure 202b. The second block 200b or the Device Name Block only comprises the variable Device Name that provides the legible name of the measuring device 103.

The third block with the Object-ID 204c and the data structure name 203c Device TAG comprise the data structure 202c Device TAG that has a character value 16 (CHAR[16]). Thus, comparable to the second data structure Device Name 203e, the size of the third data structure Device TAG 203c is also smaller than the block size of the first data structure 200a.

Under the assumption that the data structure 200a represents the maximum permissible block size in the common target bus systems, the maximum block size amounts to 20 byte in one example. Consequently, it is possible to transmit a further data structure having a maximum size of 4 byte in a combined fashion, for example, during an inquiry of the data structure "Device Name" 203b or the data structure 203c "Device TAG". The data structure "Device Name" 203b and/or "Device TAG" 203c may comprise 16 Byte. Due to the combination of different data structures that do not utilize the maximum block size, several blocks can be transmitted with a single inquiry. Consequently, the transmission capacity or transmission bandwidth can be increased.

In order to combine different blocks into one inquiry, the firmware of the measuring apparatus 103 recognizes that both blocks 200b and 200c should be queried or set by an operating tool and the firmware bundles the result of the inquiry before it transmits the result of the inquiry. In an example the firmware recognizes that both blocks belong to the same operating tool. The bundling can be used for read operations and as well for write operations. A field 402, 404 exists in the transmission protocol, which field comprises the number of transmitted inquiry parameters. This field is supplied with the corresponding value by the operating tool. Consequently, the operating tool may ensure the combination of data structures. The upload 301, 403 and/or the download 302, 413 may be embedded into the transmission protocol, for example HART.

FIG. 2 furthermore shows the 256th block 200e of the measuring apparatus 103 that combines the storage cells, variables or data structures 202e with the data structure name 203e "Adjustment". The individual variables are the float values adjustMinPercent, adjustMaxPercent, adjustMinPhysical and adjustMaxPhysical. In addition, the adjustment data structure 202e comprises the byte value adjustPhysicalUnit ID.

A DWORD comprises 4 Byte, a Character [16] comprises 16 Byte, a float value comprises 4 Byte and a byte value comprises 1 Byte. If it is assumed that the first block 200a is completely filled, the maximum block size illustrated in FIG. 2 therefore is a block of the size 5 times 4 Byte, i.e. 20 Byte. This corresponds to the maximum block size that can be transmitted in a HART field bus system. In the embodiment illustrated in FIG. 2, the size of the HART field bus system consequently determines the maximum size of the blocks, into which the storage respectively the storage area of the measuring apparatus 103 is partitioned. A block 200b, 200c, 200e does not have to be completely filled.

The combination of Manufacturer-ID, Device Type and Bus Type 202a of the data structure "Identification" 203a allows a substantially unambiguous identification of the present measuring apparatus 103. The combination Bus Type, Device Type and Manufacturer-ID therefore may be a device key or device ident that can substantially unambiguously identify the measuring apparatus 103. An operating tool that is connected to the measuring apparatus 103, the tool is not illustrated in FIG. 2, therefore can obtain a substantially unambiguous indication of the manufacturer of the present measuring apparatus 103 by querying the data structure 203a Identification and filtering the Manufacturer-ID, the Bus Type and the Device Type. Consequently, by using this mechanism of filtering desired information an inquiry for detecting substantially all field devices 103 connected to a field device bus can be carried out in an operating tool.

The operating tool can determine the associated device description for the respective bus system in use based on the substantially unambiguous identification of the measuring apparatus and therefore can access the parameters, particularly the storage cells 202a, 202b, 202c, 202e of the measuring apparatus.

Parameters that allow, for example, a calibration between the measured distance from the sensor to the bulk material surface or to the filling material surface for determining the filling level of a bulk material container are stored under the data structure name 203e "Adjustment". The values adjustMinPercent and adjustMaxPercent make it possible to convert a filling level into a percentile indication of the filling level of the observed container. The variables adjustMinPhysical and adjustMaxPhysical designate the lowest and highest possible filling level, particularly the actual distance of a bulk material from a sensor. Furthermore, the variable adjustPhysicalUnit ID indicates the unit, in which the measuring sensor measures the filling level. Possible parameters for the unit may be m (meter), ft (foot), inch, cm (centimeter) or mm (millimeter).

Figure 3:
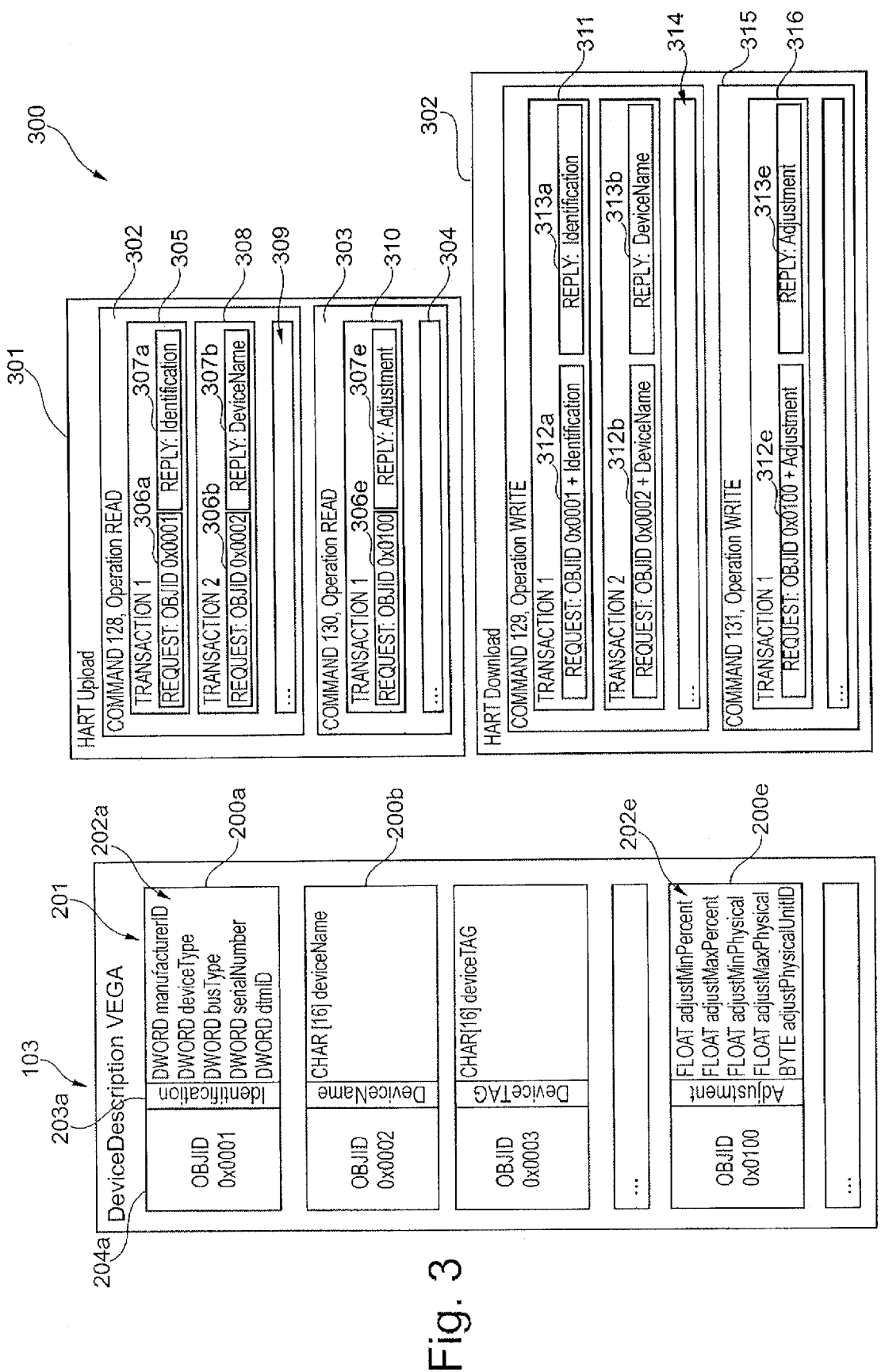
FIG. 3 shows a mapping schema of the device-specific description language on the description language of a first operating tool according to one exemplary embodiment of the present invention.

FIG. 3 shows a mapping schema of a device-specific description language on the description language of a first operating tool according to one exemplary embodiment of the present invention.

In FIG. 3, the measuring apparatus 103 from FIG. 2 is illustrated adjacent to a HART description language 300 in an operating tool, wherein the description language is schematically illustrated in the form of a block diagram. The HART commands in FIG. 3 are represented in a so-called DDL (Device Description Language) for the representation for an operating tool. To be readable for the operating tool, the HART commands are represented in a DDL. The DDL makes it possible to provide a device driver, to which an operating tool of a higher application layer may resort and on which an operating tool of a higher application layer may relay on, respectively in order to query a measuring sensor 103 or a measuring apparatus 103 or to set values substantially without having to care about and to regard, respectively, a direct addressing on the field bus.

The operating tool on a higher level accesses the storage cells of the measuring apparatus 103. The addressing is realized with the device description by converting the variables and, in particular, the addresses of the associated storage cells to a Command/Transaction notation or an Instruction/Transaction notation.

One command or instruction can address 8 Bit as defined by the specification of the description language. 0 to 255 blocks or Object-IDs or Obj IDs or transactions can be defined with an address space of 8 bit. In this case, a transaction corresponds to an inquiry of a block or of a combined block. The relation of which inquiry and which request, respectively queries which data structure is defined by the code generator 100 during the generation of the second device description 300. The second device description 300 links the data structure with a corresponding inquiry and/or with a corresponding request.

A command or an inquiry can comprise the operation read (Read) for reading out storage cells of the measuring apparatus 103 and the operation write (Write) for setting parameters. In one example, even command numbers such as, for example, 128, 130, 132, etc., may belong to read operations while odd command numbers such as, for example, 129, 131, etc., belong to write operations. Consequently, the two blocks HART Upload 301 and HART Download 302 can be subdivided respectively differentiated in the device description 300. HART Upload concerns the querying (reading) of the storage addresses 201 and Download concerns the setting (writing) of storage cells 201.

The device description 300 is mapped on a manufacturer-specific area and a manufacturer-specific region, respectively, which area is provided by the HART protocol. Commands with the command number 128 up to the command number 253 are available for manufacturer-specific use, i.e., for device specific use. The device description 300 runs on an operating tool.

The upload block 301 serves for querying data structures 201 of the measuring apparatus 103. Thus, the upload block 301 comprises the even command number 128 with the operation Read 302 and the command number 130 with the operation Read 303. In addition, further even commands may be provided as indicated with the box 304.

A transaction such as, for example, the transaction 1 305 may comprise an inquiry command (request) for a certain Object-ID, e.g., Object-ID 001 306a. The transaction 1 305 may also define that the data structure Identification 307a is delivered in response to the inquiry with the Object-ID 0x0001 in hexadecimal notation as response.

The data structure Device Name 307b that is also stored in the measuring apparatus in the form of a second block 200b can be received as a response respectively reply by again issuing the command 128 on the HART bus under transaction 2 308 and sending the request with the Object-ID 0x0002 306b. The first block that belongs to the transaction 1 305 is stored in the measuring apparatus as block 200a. The transaction numbers, e.g. transaction 1 and transaction 2, can be used to label a request and/or a reply in a command. A request with an Object-ID results in a corresponding reply in the form of providing a value in a corresponding data structure. A request and/or a reply may be sent substantially simultaneously.

Since one command in the Command/Transaction notation according to the DDL Specification can substantially only comprise 255 transactions as indicated with the box 309, one resorts to another command number, for example command 130 303, if more than 255 Object-ID's or blocks or data structures should be read from the measuring apparatus 103. Thus, for example, the Object-ID 0x0100 200e that corresponds to 256 in decimal notation is queried by the command 130 and the operation Read under transaction number 1 310. The response 307e respectively reply 307e to the inquiry or request with the Object-ID 0x0100 306e is the data structure "Adjustment" including its variables as illustrated in the block 200e and in the data structure 202e, respectively. In other words, values from an addressed data structure are assigned to corresponding variables.

If a single variable such as, for example, the Manufacturer-ID 202a should be accessed, it is consequently determined that this variable is available under the data structure name Identification 203*a* when the Object-ID 204*a* 0x001 is queried or requested, i.e., the inquiry of the Manufacturer-ID is mapped by the provided second description on an inquiry instruction using the HART command 128, the operation Read (Read) and the request with the Object-ID 0x0001 306*a*. The returned value 307*a* (Reply) provides the entire data structure Identification 200*a*, from which the desired Manufacturer-ID is filtered out.

One proceeds analogously with the other Object-IDs. Consequently, substantially all storage cells or variables 201 of the measuring apparatus 103 can be mapped on a Device Specific (device-specific) command area respectively command region of the HART protocol 300, wherein a combination of command and transaction is unambiguously assigned to each storage cell 201.

For performance reasons, it should therefore be considered during the generation of the data structures that such variables are combined into data structures which variables are represented together in an operating tool during the operation and therefore also need to be simultaneously read or written.

It would be conceivable that substantially all parameters of a sensor are read into an operating tool during the initialization of the sensor such that they are available in this operating tool.

The setting of values, i.e., the writing of specific values into the storage cells, is also realized analogously. During the writing, the odd commands of the HART download block 302 are used. The odd commands lie in the range of 129 to 253. The write block 311 that corresponds to the inquiry block or read block of the transaction 1 is addressed by the command number 129 and the operation or access method write and the transaction number 1. Within the transaction 1 311, the request or the inquiry of the Object-ID 0x001 312*a* is transmitted 312 to the measuring apparatus 103 together with the values to be set for the data structure Identification. As reply the Identification is returned 313*a* or written back by the measuring apparatus in order to confirm the correct reception of the data structure Identification that corresponds to the first data block 200*a*.

The device name that is stored in the second object block 200*b* of the measuring apparatus can be accessed 312*b* by means of the HART command 129 and the transaction 2, i.e. the request, using the operation Write under the Object-ID 0x0002 together with the values for the device name or the variable Device Name. The firmware of the measuring sensor 103 as a reply for confirming the correct writing operation writes back to the bus the feedback value 313*b*, the device name, as reply value. Thus, as reply value to the command 129, operation Write and request to Object-ID 0x0002 the firmware issues on the bus the device name, i.e. the value for the variable Device Name.

256 instructions or transactions also can be unambiguously identified 314 by means of a command, for example by means of the command 129. In case more than 255 blocks and a correspondingly larger number of variables should be set or read in the measuring device, the address range or the value range can be expanded by resorting to or using the next odd command, for example the command 131, and the operation Write 315. As transaction 316 again an inquiry 312*e* of the Object-ID 0x0100 together with the data structure 202*e* Adjustment is possible as indicated in block 312*e*. The data structure Adjustment 313*e* is as well returned respectively written back to the bus as a reply so as to confirm the correct reception by the measuring apparatus.

By separating or differentiating commands and transactions, generated target device descriptions or second device descriptions 300 can be provided as drivers for a HART bus for an operating tool in such a way that substantially all variables existing on the measuring apparatus 103 can be described and represented, respectively in the description language by corresponding combinations of command and transaction and, in particular, in a generated description language file or DDL file. Such a device description can be loaded on the operating tool such that the operating tool is able to access individual storage areas of the measuring apparatus. Due to the selection of the block size, it is possible to provide the same data structures by means of the same addressing structure, particularly under the same Object-IDs, regardless of the field bus system used. This uniform or standardized description may unify the preparation of device descriptions.

FIGS. 4.1 and 4.2 show a detailed illustration of a device description in a device description language with associated upload and download instructions according to one exemplary embodiment of the present invention. Upload and download are embedded or encapsulated in a bus protocol.

The program code 400 is a segment of a program code that can be generated as second device description by a code generator. The program code according to FIG. 4 consists of a program code in the so-called Device Description Language (DDL), i.e., in a device description language.

The program code in the DDL can be used for a HART operating tool. In this case, the program code 400 or the device description 400 functions as a driver that enables an operating tool to provide an inquiry instruction for an upload and/or download that belongs to a variable. For this purpose, variables such as a label, the type Float, the class Device (Class Device) and the handle (Handling Read & Write), and a Default Value of 100.00, are defined in a first program segment 401. The variable 402 adjustMaxPercent is defined with these definitions (the variable adjustMaxPercent in FIG. 4 differs from the variable adjustMaxPercent in FIG. 3).

The command, for example the command CMD_VVOup, is defined in a first command definition block 403. VVO may be the designation for the VEGA protocol, which is a field bus protocol. UP stands for upload and characterizes the command as an upload. Down stands for download and characterizes the command as a download.

In order to define a command and instruction, respectively, the corresponding text segment of the device description commences with the keyword "Command". Following this definition, the command number is subsequently defined as command 128. The even number indicates that this concerns an upload command, i.e. a read-out command or a read command. For that reason the operation is also defined as Read-Operation.

One example of a possible definition may consist of choosing even COMMANDs for uploads and odd COMMANDs for downloads. In another example, it would also be conceivable to utilize the COMMANDs 128 to 148 for uploads and the COMMANDs 149 to 159 for downloads.

The output to a bus or the content that is issued to a bus in response to the inquiry or request of the previously defined variable adjustMaxPercent 402 is furthermore defined as first transaction with the transaction number 0. The variable adjustMaxPercent 402 can be queried, for example, by an operating tool on a higher logical program level.

In the request program block 403, it is accordingly defined that a request command with the number 128 needs to be output and issued, respectively, to the bus in order to receive the variable adjustMaxPercent 402, wherein the variable 404 or the parameter 404 comprises the quantity of combined data structures. In the present instance, this number and quantity, respectively amounts to 0x01 404, i.e., only a single command is concerned and no combination of commands has taken place.

The code sequence 405 that sequentially reads 0x05, 0x03, 0xfd, 0x00, 0xaa is furthermore output or issued as address information.

The corresponding request message 403 is once again clearly illustrated in the upload command block 406, 406*a*. This upload command block shows that the request command commences with the Object-ID 404 0x01 or with the number of combined data structures 404. This is followed by the length of the following data structure in the form of the number of Bytes, wherein this number amounts to 0x05 in the present instance. In this case, the number of following Bytes including an indication of the number of Bytes is indicated.

The number of commands transmitted in one transaction or in one single transaction in the field 404 can be used, for example, if several transactions are combined into one command such that several blocks are queried with one command. (Corresponding fields are also provided for a download.)

The value sequence 0x03 and 0xfd is subsequently to this indicated. The hexadecimal value 0x03 stands for the number of Bytes that are used for the Object-ID. The first Byte of the Object-ID 406, 406*b* is constantly set to 0xfd in order to signal that this concerns an object of the current device generation, wherein the first Byte is followed by two variable Bytes having the actual respectively real address information, for example 0x00 and 0xaa for 0x00aa in this case.

The variable name that can be queried by means of the command number/transaction combination 128/0 is the variable adjustMaxPercent. The fact that this variable is received by using a corresponding inquiry 403 is defined in the reply block 407. In this case, it is indicated that the reply message once again comprises substantially only one data structure 408. This is also followed by the data sequence 409, 409*a*. This data sequence once again indicates the number of comprised Bytes, in the present case 0x0b including the field for the number of following Bytes. This is followed by the queried address 0x03, 0xfd for compatibility reasons and by the Object-ID 409, 409*b* 0x00, 0xaa.

The parameter or the variable 410 or the data structure adjustMaxPercent is returned in the form of a data structure, i.e., together with other variables. Consequently, the data structure varAdjust Max Percent is a data structure that contains one variable.

In addition, other status information of the data structure is returned in the form of status Bytes ST1 411 and ST2 412. Alternatively, it would also be possible to use only a single status Byte.

In order to adjust parameterizing values and values for parameter setting, respectively on the measuring apparatus 103, i.e., in order to parameterize the measuring apparatus 103 and to set parameter in the measuring apparatus, respectively, a command in the form of a DDL is also generated 413 by means of the code generator. Since this concerns a Write command or Set command, the number 129 414 is selected as command number, i.e., the numbers of the write commands lie between the numbers of the read commands (which is not absolutely imperative—see above).

The write operation is chosen as operation and an unambiguously defined write command can once again be defined from transaction number 0 to transaction number 255. A request of 1 consisting of the address information and the values of the data structure 415 to be written is sent for the writing. The number of data structures that have to be written 415 may be set to 1, indicating that substantially only one single data structure may be intended to be written.

The length of the following parameters is defined 416 in the following comma-separated part of the command. In the present case, the length amounts to 9 Bytes including the length indication 416. This is followed by address information 417 that comprises the compatibility values 0x03 and 0xfd and the Object-ID 0x00, 0xaa that is compiled and combined, respectively into the Object-ID 0x00aa. This Object-ID represents the base address for the data structure to be set. In the present case, the data structure 418 to be set needs to be indicated. In response to the successfully setting of the data structure and/or variable, the parameters that were already indicated in the request are repeated and the status Bytes 419 and 420 are additionally indicated (reply).

In other words, a read command as well as a write command may be respectively composed of an inquiry (request) and a response (reply).

Consequently, the operating tool can find out by accessing the variable 421, which request needs to be output to the bus and issued to the bus, respectively, i.e., with what request number 129 414 and with what address information 417, in order to address the correct or desired data structure 421. A list of all individual variables that form part of the data structure therefore is provided in the description language between the Object-ID and the status Bytes. Up to 256 transactions can also be defined with the download commands.

This allows providing a mapping of the device-specific blocks on commands and on parameters for an operating tool. In other words, it may be possible to provide a mapping for an operating tool to map device specific blocks on commands and on parameters.

Figure 5:
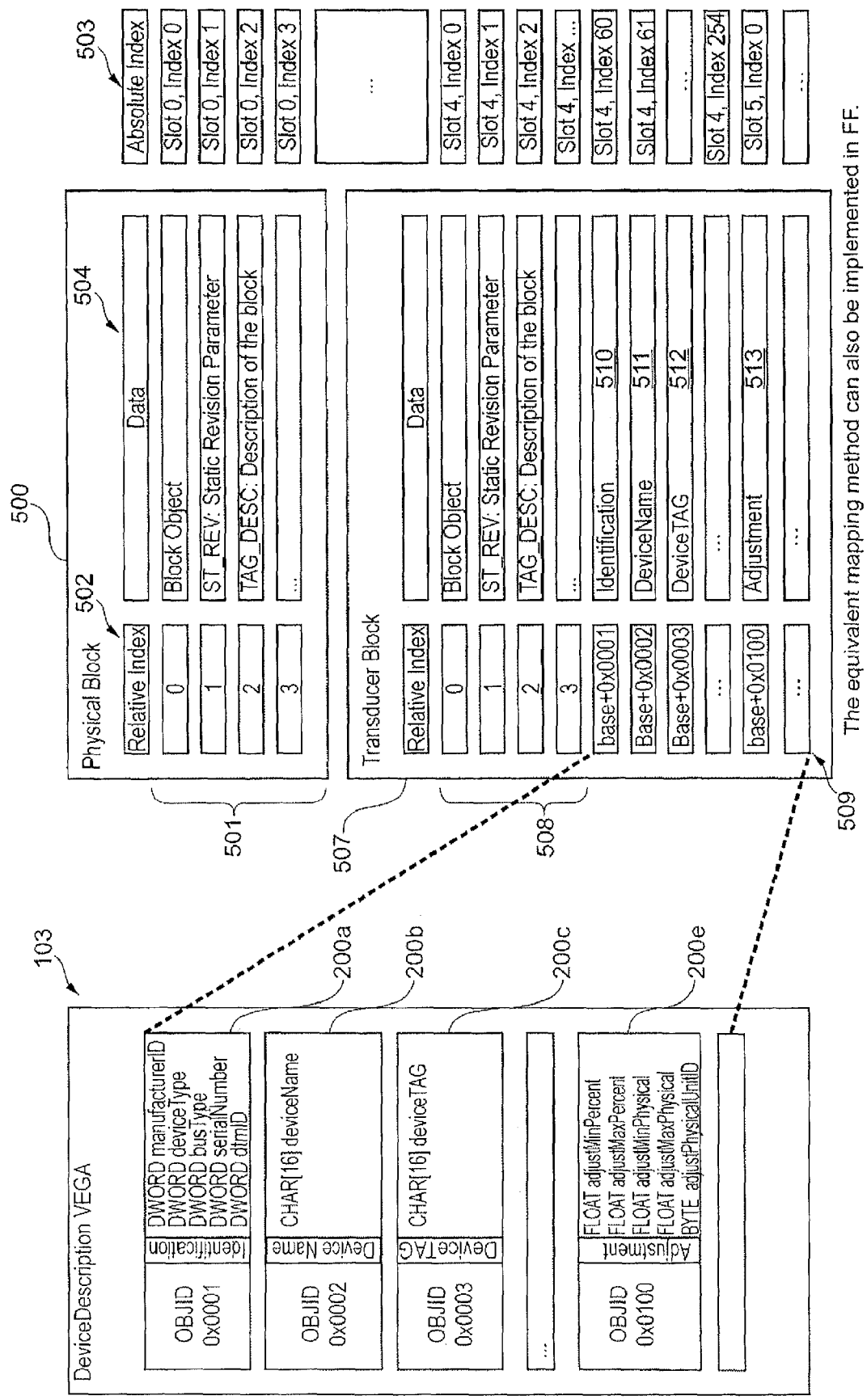
FIG. 5 shows the mapping of a device description on a Profibus PA field bus device description according to one exemplary embodiment of the present invention.

FIG. 5 shows how the device description 103 is mapped in the case that as target device description a Profibus PA field bus is selected. The equivalent mapping method or mapping principle as that illustrated for a Profibus PA in FIG. 5 can also be implemented in a Foundation Fieldbus System.

Commands for the Profibus may be organized in blocks. In this case, the physical block 500 comprises fixed inquiry parameters that concern the identification of the hardware. These inquiry parameters are organized in blocks 501 that range from a relative index 0 to 3 and from an absolute index 503 of Slot 0, Index 0 to Slot 0, Index 3, wherein the index number is incremented until a value of 254 is reached and the counting then continues by incrementing the slot number.

Consequently, an absolute index 503 for the relative index 502 can be indicated by means of the slot/index indication and by means of the slot/index indexing, respectively. The physical block 500 comprises the data blocks 504 that comprise the block object, the Static Revision Parameters and the description of the block. A Profibus device description furthermore comprises the functional block 505 that is not illustrated in FIG. 5.

The functional block 505 ranges from the relative index 0 to 3 of the functional block and comprises the data blocks 506 that comprise a block object, a Static Revision Parameter and a description of the block, i.e., a block description.

In addition, a description for the Profibus PA that may also be made in a description language such as DDL or EDDL comprises a transducer block 507.

A Block Object, a Static Revision Parameter and a description of the block are also indicated in a relative index range of the transducer block from 0 to 3 that ranges from absolute index numbers Slot 4, Index 0 to Slot 4, Index 3. Furthermore, other data can be indicated in the transducer block such that it cannot be predetermined at which position a specified part of the transducer block 508 ends. This is indicated with three dots in FIG. 5.

Subsequent functional blocks or calls are presented beginning at a base address (base) with the Object-ID of the corresponding blocks 200a to 200f of the device description 103. Consequently, the blocks and, in particular, the parameter values or variable values 202a to 202e are mapped on a corresponding device-specific part of the transducer block 509 that is available.

The block size, i.e., the information to be transmitted with one block, has a maximum size of 64 Byte. However, since the block size 200a, 200b, 200c, 200e is based on the maximum block size in the HART field bus, the blocks of the transducer block are not completely filled.

The following describes which blocks of the measuring apparatus 103 are mapped on the corresponding blocks in the transducer block 507.

The data structure Identification 200a with the Object-ID 0x0001 is mapped on the block Identification 510.

The Object-ID 0002 that describes the Block Device Name 200b is mapped on the base address plus the corresponding Object-ID, and thus, on the Device Name block 511.

The Object-ID 0x0003 of the Device TAG Block 200c is mapped on the Device TAG 512 and the data structure Adjustment of the block 200e of the Object-ID 0x0100 is mapped on the block 513 corresponding to Slot 5, Index 0 in absolute addressing or to base address plus the Object-ID 0x100 in relative addressing.

Although each of the blocks has a size of 64 byte according to the Profibus specification 510, 511, 512, 513, the content merely comprises to 20 byte in order to be compatible with the maximum size, which is defined by the HART field bus that is intended to be used alternatively to the Profibus.

It would be conceivable to combine several small HART-blocks into a Profibus-block or into a transducer block, particularly while reading individual transducer blocks. This would also be possible during writing. The Profibus-block and/or the transducer block may be a single block or an entire block.

The provision of an index (Indizierung) and indexing, respectively by means of the slot number and the index number may correspond to the provision of an index and indexing, respectively by means of a command and a transaction number in the HART device description. Consequently, the same device specification of the measuring apparatus 103 can also be represented in a corresponding Profibus addressing. Thus, the device specification may be uniformly represented in the HART addressing and/or in the Profibus addressing.

Figure 6:
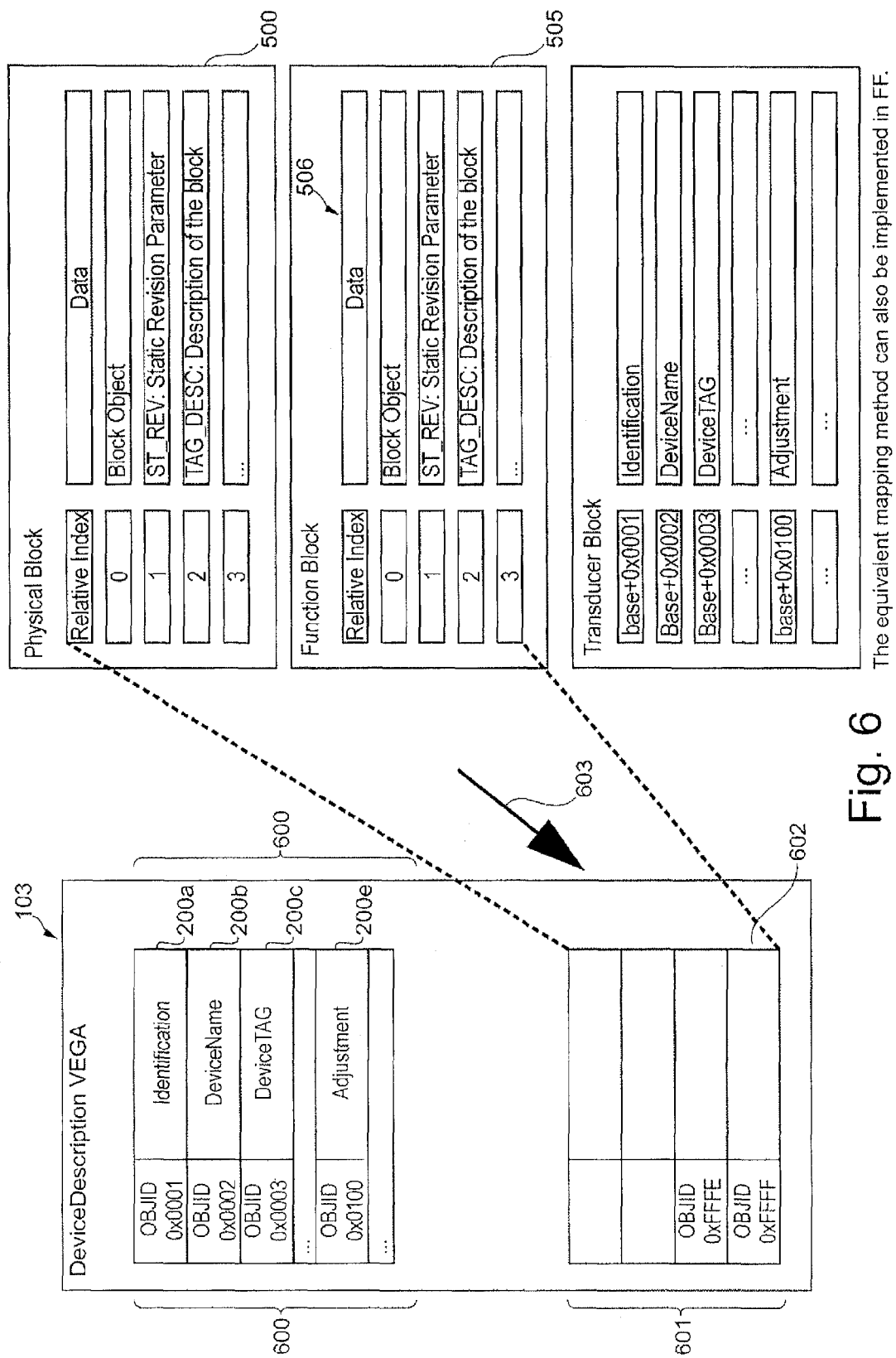
FIG. 6 shows a block diagram of an operating tool and a measuring apparatus, in which one physical block and one functional block are mapped back on a device-specific description, according to one exemplary embodiment of the present invention.

FIG. 6 shows a block diagram of an operating tool and a measuring apparatus according to one exemplary embodiment of the present invention, wherein one physical block and one functional block are mapped back on a device-specific description.

The Device Description 103 may comprise the individual data structures or data structure blocks 200a, 200b, 200c, 200e in a sequential block 600. Once all available variables are distributed over the storage of the measuring apparatus 103, a free region 601 may still be available in the storage of the measuring apparatus 103. The parameters of the physical block 500 and of the functional block 505 are mapped in descending Object-ID sequence to the free region starting from the highest Object-ID 0xffff 602. A fixed allocation may exist during the mapping beginning with the starting address that results from the end address minus the number of required slots. In this case, the description of the functional block 505 is mapped, for example, on the Object-ID 0fff 602.

An mandatory required physical block and an optionally required functional block of the Profibus field bus protocol therefore can be stored in the manufacturer's proprietary device description of the measuring apparatus 103. This means that the parameters of the physical block 500 and of the functional block 505 are mapped back on the rearmost regions 601 of a storage of a measuring apparatus 103 as indicated with the arrow 603. Similar to the Profibus PA, the back-mapping, the reverse mapping or the mapping method can also be used in the Foundation Field Bus.

Figure 7:
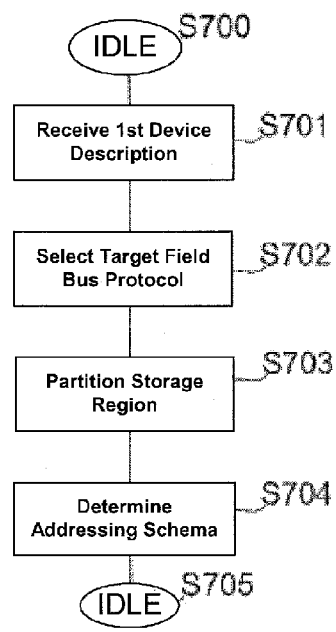
FIG. 7 shows a flow chart of a method for generating a device description for a measuring device according to one exemplary embodiment of the present invention.

FIG. 7 shows a flow chart for a method for generating a device description of a measuring apparatus according to one exemplary embodiment of the invention.

The method is in an Idle State in step S700.

In step S701, a first device description of the measuring apparatus is received, for example, in a receiving device. The first device description or device-specific description is received in a sensor-specific description language or measuring apparatus description language.

In this case, the first device description of the measuring apparatus comprises at least one variable, wherein the at least one variable is related to a storage cell of the measuring apparatus, particularly to a storage device of the measuring apparatus. Consequently, the variable provides the storage cell with a name. Due to bijective mapping and bijective projecting, respectively, the name of a storage cell is bijective and the storage cell is bijectively defined such that unambiguous values can be stored in the corresponding storage cell.

In step S702, a target field bus protocol is selected from a plurality of field bus protocols, and in step S703 a storage region that comprises a plurality of storage cells of the measuring apparatus is partitioned into individual blocks, wherein each of the blocks comprises at least one variable or storage cell.

The at least one block has a maximum block size that corresponds to the smallest maximum block size of the plurality of field bus protocols. Consequently, the maximum block size that can be transmitted with a single inquiry or with a single request is determined for each possible field bus protocol that is provided, in particular that is provided for selection (for example by the selecting device). The selecting device may allow selecting between a plurality of field bus protocols.

In this context, the term transmission refers to the downloading direction as well as to the uploading direction. The uploading direction designates the readout from a measuring apparatus while the downloading direction designates the loading of values on the measuring apparatus. Thus, the upload transmits values from the measurement apparatus to the operating tool and the download transmits values from the operating tool to the measuring apparatus.

The smallest maximum size of the determined maximum block sizes of the different field bus protocols is determined which smallest size then will be used for partitioning the storage cells of the measuring apparatus into blocks.

The partitioning step can be eliminated if the storage device is already partitioned, segmented or structured in this smallest maximum block size, for example, due to the chip design of a storage for the field device.

The maximum block size is the block size that can be transmitted via the field bus with a single request when the respective field bus protocol is used. Consequently, a standardized respectively uniform addressing of the variables or parameters or the storage cells of the measuring apparatus can be achieved in the different or in the plurality of available field bus protocols or target field bus protocols. In step S704, the addressing schema determined for the selected field bus protocol or the at least one determined block is provided as second device description or target device description before the method returns into an Idle State in step 705.

As a supplement, it should be noted that "comprising" and "featuring" do not exclude other elements or steps, and that "an" or "a" does not exclude a plurality. It should furthermore be noted that characteristics or steps that were described with reference to one of the above embodiments can also be used in combination with other characteristics or steps of other above-described embodiments. The reference numerals in the claims should not be interpreted in a restrictive sense.

What is claimed:

1. A method of generating a device description for a measuring apparatus, the device description usable in a plurality of field bus protocols, the method comprising:
   receiving a first device description of the apparatus, the first device description including at least one variable, the at least one variable being related to a storage cell of the apparatus;
   selecting a target field bus protocol from the plurality of field bus protocols each having a maximum block size, the maximum block size being transmittable via a field bus with a single request when any of the plurality of field bus protocols is used;
   forming at least one block from the at least one variable, the at least one block having a maximum block size that corresponds to a smallest maximum block size of at least two field bus protocols of the plurality of field bus protocols; and
   providing the at least one block as a second device description of the apparatus in the target field bus protocol.

2. The method of claim 1, wherein the target field bus protocol is at least one target field bus protocol that is selected from the group of target field bus protocols consisting of
   a HART field bus protocol;
   a Profibus field bus protocol;
   a Foundation Fieldbus Protocol;
   a Modbus protocol;
   an IO-Link protocol;
   a FDI protocol and
   a CAN protocol.

3. The method of claim 1, wherein the at least one block is provided in a device description language that is selected from the group of device description languages consisting of
   DDL;
   EDDL;
   DTM, and
   FDI.

4. The method of claim 1, wherein the at least one block is addressed by an Object-ID.

5. The method of claim 1, wherein the second device description is uniformly addressable in each of the least two field bus protocols of the plurality of field bus protocols.

6. The method of claim 1, wherein the second device description is provided such that different blocks is addressed by at least one of a command number and a transaction number.

7. The method of claim 1, wherein the second device description is provided such that different blocks is addressed using at least one of a slot number and an index.

8. The method of claim 1, wherein the apparatus is a measuring apparatus that is selected from the group of measuring apparatuses consisting of a sensor;
   a level sensor;
   a pressure sensor, and
   a limit level sensor.

9. The method of claim 1, wherein the least one variable corresponds to a value for setting parameter.

10. The method of claim 1, further comprising:
    combining at least two blocks into one joint block, the block size of which being smaller or equal to the maximum block size.

11. The method of claim 1, wherein the first device description is an XML file.

12. A computer-readable storage medium comprising a program code which, when it is executed by a processor, generates a device description for a measuring apparatus, the device description being usable in a plurality of field bus protocols by performing the following steps:
    receiving a first device description of the apparatus, the first device description including at least one variable, the at least one variable being related to a storage cell of the apparatus;
    selecting a target field bus protocol from the plurality of field bus protocols, each having a maximum block size, the maximum block size being transmittable via a field bus with a single request when any of the plurality of field bus protocols is used;
    forming at least one block from the at least one variable, the at least one block having a maximum block size that corresponds to a smallest maximum block size of at least two field bus protocols of the plurality of field bus protocols; and
    providing the at least one block as a second device description of the apparatus in the target field bus protocol.

13. A device for generating a device description for a measuring apparatus, the device description usable in a plurality of field bus protocols, the device comprising:
    a receiving device receiving a first device description of the apparatus, the first device description includes at least one variable, the at least one variable being related to a storage cell of the apparatus;
    a selecting device selecting a target field bus protocol from the plurality of field bus protocols for the first device description received by the receiving device, each of the plurality of field bus protocols having a maximum block size, the maximum block size being transmittable via a field bus with a single request when any of the plurality of field bus protocols is used, the selecting device comprising a plurality of selection channels; and
    a providing device connected to at least one of the plurality of selection channels forming at least one block from the at least one variable, the at least one block having a maximum block size that corresponds to a smallest maximum block size of at least two field bus protocols of the plurality of field bus protocols, the providing device providing the at least one block as a second device description of the apparatus in the target field bus protocol.

14. A measuring sensor comprising:
    at least one storage cell that is related to at least one variable,
    wherein a block is formed from the at least one variable, the at least one block having a maximum block size, the maximum block size corresponding to the smallest maximum block size of a plurality of field bus protocols, the maximum block size being transmittable via a field bus with a single request when the respective field bus protocol is used;
    wherein the maximum block size of the used field bus protocol is incompletely filled when the used field bus protocol uses a higher maximum block size than the smallest maximum block size, and wherein several blocks can be transmitted with the single request when a combination of different data structures do not utilize the maximum block size.

15. A method for generating a device description for a measuring apparatus in a target field bus protocol, the device description usable in a plurality of field bus protocols, the method comprising:

receiving a first device description of the apparatus, the first device description including at least one variable, the at least one variable being related to a storage cell of the apparatus;

selecting the target field bus protocol from the plurality of field bus protocols each having a maximum block size, the maximum block size being transmittable via a field bus with a single request when any of the plurality of field bus protocols is used;

forming at least one block from the at least one variable, the at least one block having a maximum block size that corresponds to a smallest maximum block size of at least two field bus protocols of the plurality of field bus protocols, wherein the transmitted block size is less than the maximum block size of the target field bus protocol; and providing the at least one block as a second device description of the apparatus in the target field bus protocol.

* * * * *